United States Patent [19]
Vanotti

[11] Patent Number: 5,740,651
[45] Date of Patent: Apr. 21, 1998

[54] ANCHORING SLEEVE

[75] Inventor: Gérard Lucien Vanotti, Saint-Paul-de-Varax, France

[73] Assignee: Vape Rail International S.A., France

[21] Appl. No.: 716,166

[22] PCT Filed: Mar. 17, 1995

[86] PCT No.: PCT/IB95/00186

§ 371 Date: Nov. 13, 1996

§ 102(e) Date: Nov. 13, 1996

[87] PCT Pub. No.: WO95/25900

PCT Pub. Date: Sep. 28, 1995

[30] Foreign Application Priority Data

Mar. 18, 1994 [FR] France .................. 94 03223
Nov. 22, 1994 [ES] Spain .................... 9402985

[51] Int. Cl.⁶ .......................... F16B 13/06; F16B 13/12
[52] U.S. Cl. ...................... 52/698; 52/700; 52/704; 52/302.3; 52/745.21; 249/91; 249/97; 411/44; 411/55
[58] Field of Search ......................... 52/698, 699, 700, 52/704, 302.3, 745.21; 249/83, 91, 97; 411/44, 55

[56] References Cited

U.S. PATENT DOCUMENTS

| | | | |
|---|---|---|---|
| 751,180 | 2/1904 | Krause | 249/91 X |
| 1,264,189 | 4/1918 | Keator | 52/699 X |
| 2,545,045 | 3/1951 | Rosan | 411/166 |
| 2,560,951 | 7/1951 | Henderson et al. | 411/166 X |
| 4,195,709 | 4/1980 | Gianotti et al. | 52/698 X |
| 4,412,407 | 11/1983 | Melfi et al. | 52/707 X |
| 4,629,155 | 12/1986 | Dula | 52/707 X |
| 4,642,964 | 2/1987 | Kellison | 52/699 |
| 4,861,197 | 8/1989 | Calandra, Jr. | 411/44 X |
| 4,946,325 | 8/1990 | Abraham | 411/55 X |
| 5,085,547 | 2/1992 | Vanotti | 411/178 X |
| 5,490,750 | 2/1996 | Gundy | 411/55 |
| 5,641,256 | 6/1997 | Gundy | 411/55 |

FOREIGN PATENT DOCUMENTS

| | | |
|---|---|---|
| 2 092 694A | 8/1982 | European Pat. Off. . |
| 2 425 014 | 11/1979 | France . |
| 2651930 | 6/1977 | Germany ................ 411/55 |

OTHER PUBLICATIONS

Search Report listing cited references.

Primary Examiner—Wynn E. Wood
Assistant Examiner—Laura A. Callo
Attorney, Agent, or Firm—Kane, Dalsimer, Sullivan, Kurucz, Levy, Eisele and Richard, LLP

[57] ABSTRACT

An anchoring sleeve for receiving a screw in a concrete building element, consists of a tubular body (1) made of synthetic material and surrounded by a metal shell (8) which only partially covers the synthetic body (1) so that at least the lower end thereof is exposed and can be destroyed by dissolving or perforating it so that water can flow through.

10 Claims, 2 Drawing Sheets

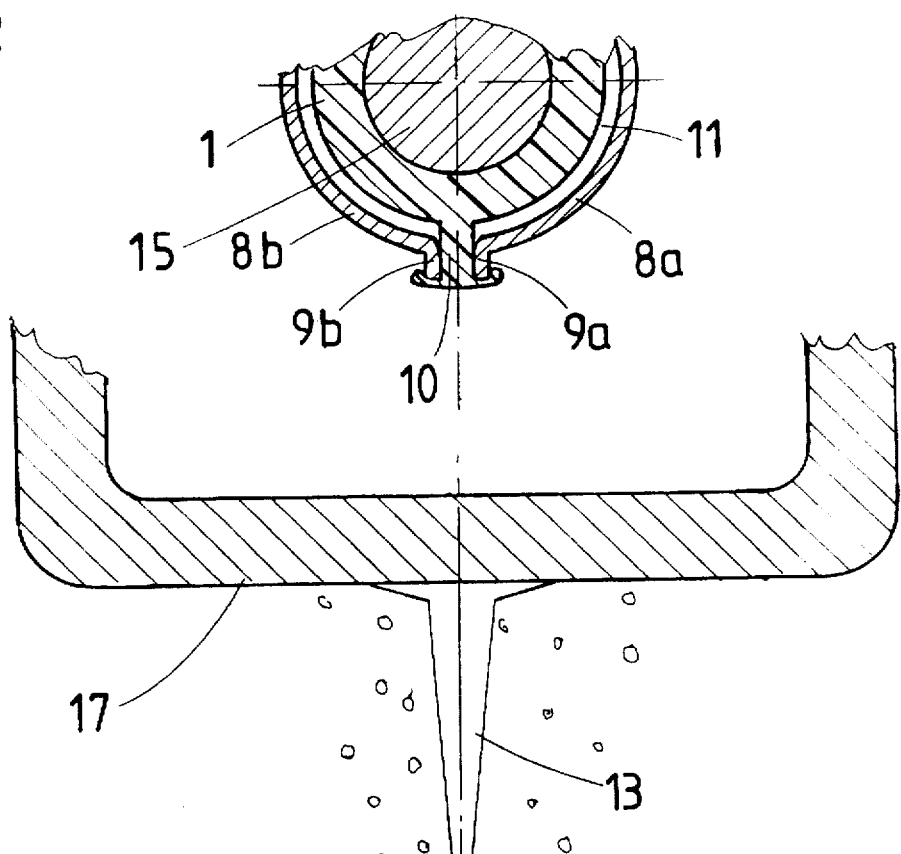
FIG. 2
FIG. 1
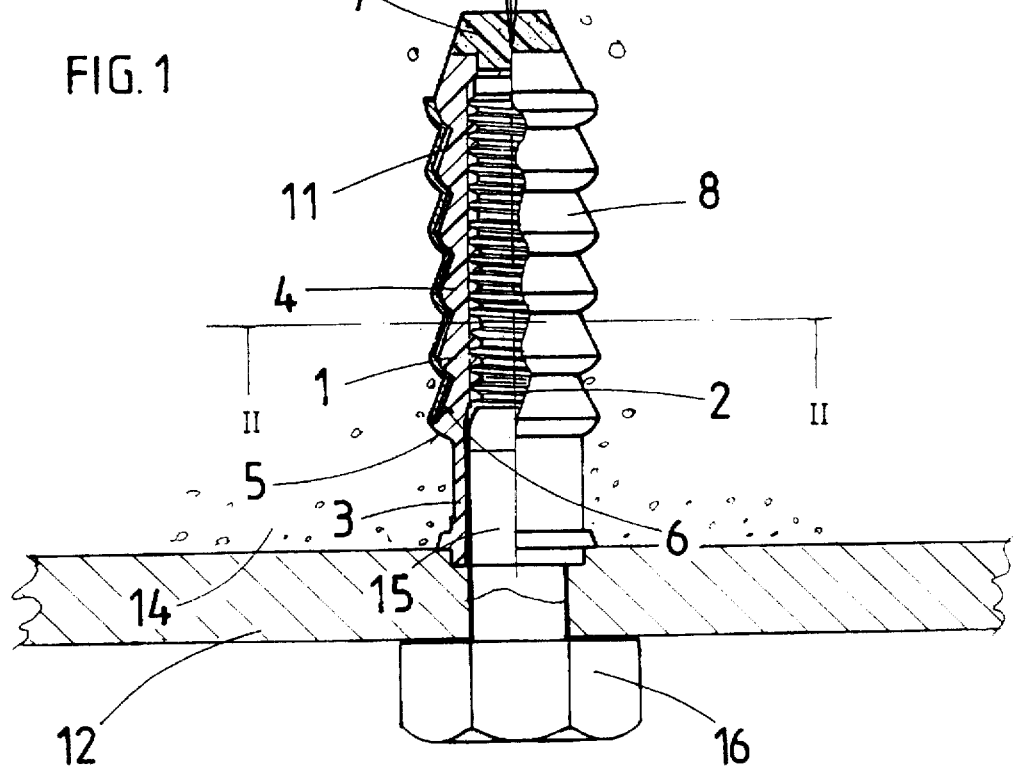

ANCHORING SLEEVE

The subject of the present invention is an anchoring sleeve intended to receive a screw in a concrete building element, the sleeve consisting of a tubular body made of synthetic material which on the inside has a screw thread which corresponds to the screw thread of the screw and, on the outside, has peripheral anchorage and load-spreading bosses and two longitudinal ribs, this body being surrounded by a metal shell consisting of two half-shells fixed to the longitudinal ribs of the body made of synthetic material in order to create a diametral clearance intended to take up the differential plastic/metal/concrete expansions.

Anchoring sleeves of this type are described in the patent FR 2,425,014 and 2,636,685 in the name of the Applicant. These sleeves can be built into a concrete element at the time of its manufacture, or can be placed in a subsequent operation, sealed in with quick-setting mortar or resin. These sleeves are known to users under the brand name PLASTI-RAIL and are, above all, used for fixing rails to concrete sleepers. The body made of synthetic material of these sleeves is closed at its end and the metal shell completely surrounds the body made of synthetic material, that is to say also surrounds its non-threaded upper part and its lower end, even though these regions do not need to withstand the force of the anchor bolt. These sleeves come with a plug so as to prevent entry into the sleeve of water or any foreign body, such as a stone, liable to oppose the screwing of an anchor bolt into the sleeve with the risk of bursting of the sleeve and cracking of the concrete under the pressure of the anchor bolt. These plugs, do not, however, provide a perfect seal and water can enter the sleeve and collect in the bottom thereof. Under certain weather conditions this water may freeze and form a plug of ice against which the anchor bolt bottoms out when it is screwed into the sleeve. This plug of ice may then have the same effect as a stone, that is to say may transmit the pressure of the anchor bolt to the sleeve and to the surrounding concrete, with the risk that the pressure exerted might lead to cracking of the concrete and breakage of the screw threads of the sleeve.

The object of the present invention is to eliminate the risks explained herein above and at the same time to reduce the cost of the sleeves.

To this end, the anchoring sleeve according to the invention is characterized in that the metal shell stretches only over part of the body made of synthetic material so as to leave at least the lower end of this body free, and in that the said lower end can be destroyed.

The metal shell preferably stretches only over the height which, mechanically speaking, is necessary, that is to say around the threaded part of the body made of synthetic material, thus making it possible to reduce the amount of metal used, which has the result of substantially reducing the cost price of this shell and thus the final cost price of the anchoring sleeve.

When the anchoring sleeve is placed in the concrete, the lower end of the body made of synthetic material is destroyed, for example by perforation, which allows water to drain out of the sleeve.

When the prefabricated concrete element is obtained by casting, perforation may be provided by a spike fixed in the mould. After mould release, this spike leaves a passage which forms a drainage well.

In one embodiment, the lower end of the body made of synthetic material is closed by an end cap made of a material that can be destroyed, for example, by using an appropriate solvent. In addition, destroying this end cap leaves a cavity situated underneath the threaded part of the body of the sleeve and substantially below the lowermost point reached by the screw or the anchor bolt so that a foreign body, for example a pebble, has no effect on the anchoring sleeve and the surrounding concrete.

When the capped sleeve is used in a mould equipped with a spike as described earlier, the spike spears the end cap so that after the end cap has been destroyed, a drainage well is formed in the concrete.

Bearing in mind the differences in thermal expansion between the metal of the metal shell and the synthetic material of the body of the sleeve, it is necessary to leave a clearance between the body and the metal shell. In the anchoring sleeve of the prior art described in patent FR 2,425,014, this clearance is provided by forming circular spacing projections on the body made of synthetic material. In the anchoring sleeve according to the invention, this expansion clearance is preferably obtained in a simpler and more effective way by means of peripheral depressions formed on the body in the region of the peripheral anchoring bosses, that is to say on the active and operational part of the sleeve.

The attached drawing represents, by way of example, two embodiments of the invention.

FIG. 1 is a view in axial half-section of an anchoring sleeve embedded in a concrete building element, according to a first embodiment.

FIG. 2 is a transverse half-section on II—II of FIG. 1, and along a vertical plane of symmetry.

Figure 3:
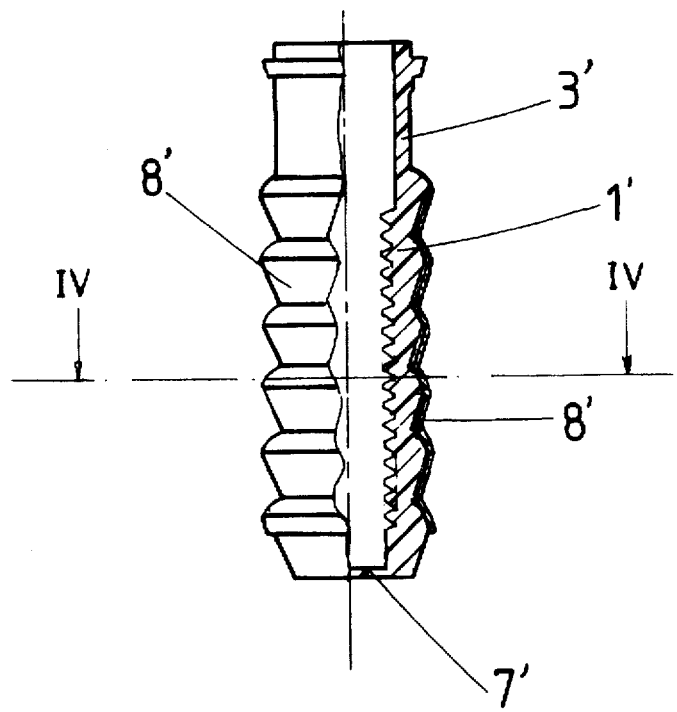
FIG. 3 is a view in axial section of a second embodiment.

The anchoring sleeve represented in FIG. 1 consists of a tubular body 1 made of thermoplastic synthetic material, for example made of polyamide reinforced with glass fibres, which on the inside, over most of its length, has a screw thread 2 of trapezoidal shape similar to the trapezoidal screw thread of an anchor bolt, not represented. In its upper part, the body 1 has a cylindrical part which is smooth on the inside. Around its threaded part, the body 1 is provided with several peripheral bosses 4 of substantially triangular cross-section with rounded vertex so that each boss is bounded at the top by a first frustoconical surface 5 and at the bottom by a second frustoconical surface 6 which is inclined somewhat more steeply than the frustoconical surface 5, the inclination of which is approximately 30° relative to a plane perpendicular to the axis of the sleeve. The function of the frustoconical surfaces 5 is to spread and direct the loads in an appropriate way, as described in patent FR 2,636,685. The lower end of the tubular body 3 is closed by an end cap 7 extending and completing the frustoconical profile at the end of the body 1. This end cap 7 is made of a material that can be destroyed, for example by being dissolved, and has a low density, for example made of expanded polystyrene.

The body 1 is surrounded, over most of its length, by a steel shell 8 consisting of two half-shells 8a and 8b (FIG. 2) mating with the shape of the peripheral bosses 4. The half-shells 8a and 8b have bent vertical edges such as 9a and 9b by means of which the half-shells are fixed, using an upsetting technique similar to snap rivetting, to two diametrically opposed longitudinal ribs 10 of the body 1. The half-shells are in contact with the frustoconical surfaces 5, because they constitute mechanical interfaces between the sleeve and the concrete, while an expansion clearance 11 is formed between the body 1 and the metal shell 8 by peripheral depressions formed in the frustoconical surface 6. These depressions or recesses are easy to obtain by moulding. The expansion clearances 11 are provided only in the working regions, and the metal shell 8 stretches only over about ⅔ of the total length of the body 1, which makes it possible to make a substantial saving on the cost of the anchoring sleeve. Since the upper part 3 of the anchoring sleeve and its frustoconical lower end do not have to withstand forces, metal sleeving of these parts is unnecessary.

One way of using the anchoring sleeve represented in FIGS. 1 and 2 will now be described.

In the example of use in question, the anchoring sleeve is embedded in prefabricated concrete element, for example a railway sleeper, at the time of casting of this concrete element, using conventional and known systems for fixing to the bottom of the mould. After having fixed the anchoring sleeve to the bottom 12 of the mould using a bolt 16, a spike 13, integral with a special support 17, is arranged on the upper part of the mould so that this spike spears the end cap 7 at least approximately axially. This spearing requires no precision. The concrete 14 is then poured into the mould. Upon mould release, the withdrawal of the spike 13 leaves a well penetrating the end cap 7.

Next, the end cap 7 made of expanded polystyrene is eliminated by dissolving, for example using a few drops of trichloroethylene. The elimination of the end cap leaves a cavity corresponding with the well left by the spike 13, which well constitutes a drainage well for any water which has entered the anchoring sleeve. Whether the sealing of the temporary plug is good or bad is therefore no longer of any importance.

If it is a small stone or piece of gravel which has entered the anchoring sleeve, then the stone or gravel will drop into the cavity left free by the end cap 7 without any risk of this foreign body being reached by the end of the anchor bolt when it is screwed into the anchoring sleeve.

When the anchoring sleeve is being fitted into a concrete element which already exists, by piercing the concrete and sealing in the anchoring sleeve by bonding, the end cap is eliminated in the same way. For an end cap made of expanded polystyrene eliminated using trichloroethylene, the product of the reaction is highly volatile which means that the end cap disappears instantaneously.

The end cap 7 may be made of any material that can be destroyed using an agent which does not attack the body made of synthetic material of the anchoring sleeve.

The metal half-shells could be fixed together by clipping.

Figure 4:
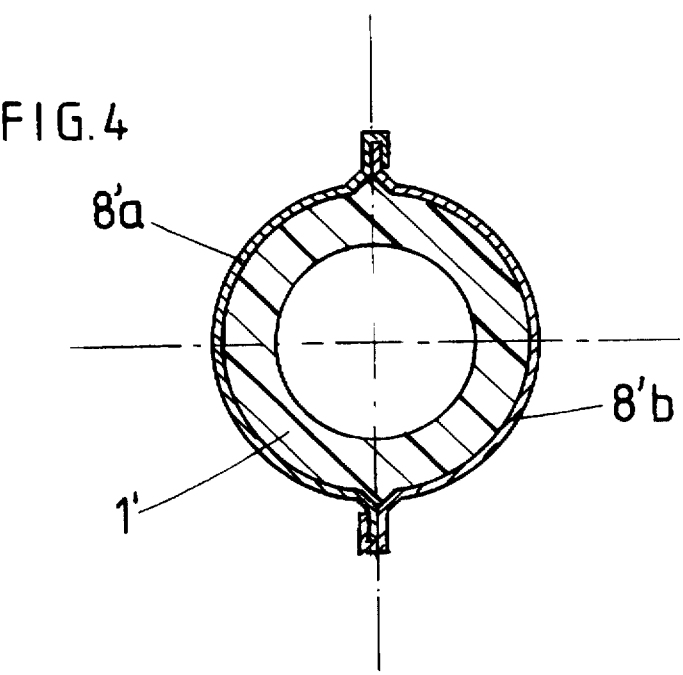
FIG. 4 is a transverse section of IV—IV.

In the embodiment represented in FIGS. 3 and 4, in which the components which correspond to the first embodiment have been denoted by the same reference numerals accompanied by the ' symbol, the end cap 7 is replaced by a thin wall 7' formed integrally with the plastic body 1'. This wall 7' can easily be perforated. The metal shell 8' consists of two identical half-shells 8'a and 8'b fixed together by crimping, as represented in FIG. 4. The manufacture of this anchoring sleeve is thus simplified, with a saving of metal, while retaining the known advantages of the PLASTIRAIL sleeve.

This anchoring sleeve can be used in the same way as the sleeve represented in FIG. 1, that is to say in a mould containing a spike 13 which will destroy the thin wall 7' by perforating it, so as to leave a well which communicates with the inside of the sleeve, after mould release.

I claim:

1. Anchoring sleeve intended to receive a screw in a concrete building element, the sleeve comprising a tubular body (1) having ends and being closed at one of said ends and made of synthetic material which on the inside has a screw thread (2) and, on the outside, has peripheral anchorage ahd load-spreading bosses (4) and two longitudinal ribs (10), said body being surrounded by a metal shell (8) consisting of two half-shells (8a, 8b) fixed to the longitudinal ribs of the body made of synthetic material, characterized in that the metal shell (8) stretches only over part of the body (1) made of synthetic material so as to leave at least the closed end of this body free, and in that the said closed end is able to be destroyed.

2. Anchoring sleeve according to claim 1, characterized in that the closed end of the tubular body made of synthetic material is closed by an end cap (7) made of a material which is able to be destroyed.

3. Anchoring sleeve according to claim 2, characterized in that the body (1) is made of polyamide and the end cap is made of expanded polystyrene.

4. Anchoring sleeve according to claim 1, characterized in that the closed end of the tubular body made of synthetic material is closed by a wall (7') which is thin relative to the thickness of the tubular wall of the body.

5. Anchoring sleeve according to claim 1, characterized in that the metal shell (8) stretches exclusively around the peripheral bosses (4) and around the screw thread of the body made of synthetic material.

6. Anchoring sleeve according to claim 5, characterized in that the metal shell (8) stretches over a length equal to approximately ⅔ of the length of the body made of synthetic material.

7. Anchoring sleeve according to claim 5, characterized in that the two metal half-shells (8a, 8b) are identical.

8. Anchoring sleeve according to claim 1, characterized in that a radial expansion clearance (11) is provided between the body made of synthetic material and the metal shell, this clearance being provided by peripheral depressions in the body (1) in the region of the peripheral anchoring bosses.

9. Method for using the anchoring sleeve according to claim 1, in a concrete element obtained by casting in a mould, characterized in that the anchoring sleeve is first of all fixed into the mould and then a spike (13) is arranged in the mould, at least approximately along the axis of the sleeve, so that said spike is able to perforate the closed end of the tubular body made of synthetic material, introducing concrete into the mould, releasing the mould and positioning the sleeve vertically so that after the mould release and vertical positioning of the sleeve a drainage well is obtained under the perforated end of the sleeve.

10. Method for using the anchoring sleeve according to claim 9, in a concrete building element, characterized in that the anchoring sleeve being fixed into the concrete, and thereafter the end cap (7) is eliminated using a solvent.

* * * * *